United States Patent [19]

Ichikawa

[11] 4,006,368
[45] Feb. 1, 1977

[54] A.C. VOLTAGE REGULATOR INCLUDING BILATERAL THYRISTOR

[75] Inventor: Kazuo Ichikawa, Nagano, Japan

[73] Assignee: Olympus Optical Co., Ltd., Tokyo, Japan

[22] Filed: Mar. 3, 1976

[21] Appl. No.: 663,222

[30] Foreign Application Priority Data

Mar. 4, 1975    Japan .............................. 50-26386

[52] U.S. Cl. .......................... 307/252 B; 307/297; 323/24; 323/38; 323/39

[51] Int. Cl.² ................ H03K 17/72; H03K 17/02

[58] Field of Search ............... 307/252 B, 297, 318; 323/24, 38, 39

[56]         References Cited
         UNITED STATES PATENTS

| 3,346,874 | 10/1967 | Howell ....................... 323/39 X |
| 3,436,562 | 4/1969 | Harris, Jr. ..................... 307/252 B |
| 3,484,623 | 12/1969 | Cain ............................. 307/252 B |

Primary Examiner—John Zazworsky

[57]                 ABSTRACT

An a.c. voltage regulator comprises a three terminal, bilateral thyristor connected across an a.c. power source in series with a load. According to the invention, the bilateral thyristor is associated with a time constant circuit including a variable resistor and a capacitor, and is also associated with a bilateral diode serving to produce a trigger pulse. A phase control is thus exercised over the conduction of the bilateral thyristor. In accordance with the invention, a resistor is connected between one of the anodes of the bilateral thyristor and the variable resistor, and a pair of constant voltage diodes are connected across the variable resistor and the capacitor, respectively, through a common diode.

1 Claim, 3 Drawing Figures

A.C. VOLTAGE REGULATOR INCLUDING BILATERAL THYRISTOR

BACKGROUND OF THE INVENTION

The invention relates to an a.c. voltage regulator employing a bilateral thyristor, and more particularly, to a phase controlled a.c. voltage regulator which employs a three terminal, bilateral thyristor. A conventional phase controlled a.c. voltage regulator which uses a three terminal, bilateral thyristor is shown in FIG. 1, in which the opposite terminals 1a, 1b of an a.c. source 1 is connected in a series circuit comprising a load 2 and a three terminal, bilateral thyristor 3. A time constant circuit comprising a series combination of a variable resistor 7 and a capacitor 8 is associated with the thyristor, with one end of the resistor 7 connected with a second anode terminal 4 of the thyristor 3 and one terminal of the capacitor 8 with a first anode terminal 5 of the thyristor 3. The junction between the resistor 7 and the capacitor 8 is connected with a gate terminal 6 of the thyristor through a bilateral diode 10. The three terminal, bilateral thyristor may comprise TRIAC (trademark of General Electric Company), for example, and the bilateral diode 10 may comprise a DIAC (trademark of General Electric Company).

In the conventinal regulator circuit shown, the bilateral thyristor 3 is initially non-conductive, so that the capacitor 8 is charged through the load 2 and the variable resistor 7 connected in series. As the terminal voltage of the capacitor 8 reaches a breakover voltage of the bilateral diode 10, the latter conducts, applying a trigger pulse to the gate terminal 6 in synchronism with each half cycle of the source frequency. Thereupon, the thyristor conducts, whereby current flows from the source 1 through the load 2 and the thyristor 3. The phase angle at which the thyristor 3 begins its conduction can be controlled by changing the time constant of resistor 7 and capacitor 8, thereby changing the phase angle of the trigger pulse which is produced during each one-half cycle of the alternating current. In this manner, the average voltage or the effective value thereof across the load 2 can be regulated.

However, with the described circuit, when the voltage of the source 1 rises, a charging current to the capacitor 8 increases, so that the thyristor 3 initiates its conduction earlier in time, thus increasing the effective voltage across the load 2. Thus, a voltage fluctuation of the source 1 is amplified to cause an even greater variation in the effective voltage of the load 2. In one experiment in which a source 1 having a voltage of 100 volts is used and the effective voltage across the load 2 is adjusted to 30 volts, it is found that a fluctuation of the source voltage of ±10% from the nominal value resulted in a change of ±100% in the effective voltage across the load 2 from the adjusted value of 30 volts. In addition, with the circuit described, if the direction of current flow from the source 1 is reversed before the terminal voltage of the capacitor 8 reaches the breakover voltage of the bilateral diode 10, the charge on the capacitor 8 cannot have time to discharge before it is charged in the opposite direction, preventing the voltage across the capacitor 8 from reaching the breakover voltage of the diode 10. This means that the circuit fails to adjust effective voltage across the load 2 over a range beginning from zero volts. In one experiment using a source voltage of 100 volts, it is found that when it is attempted to increase the effective voltage from zero volts, it jumps from zero volt to 25 volts stepwise. When reducing the effective voltage from a level of 25 volts, it also jumps from 10 volts to zero volt.

SUMMARY OF THE INVENTION

It is an object of the invention to provide an a.c. voltage regulator employing a three terminal, bilateral thyristor which eliminates the above disadvantages, by an additional provision of a resistor, a pair of constant voltage diodes and a diode.

In accordance with the invention, the provision of the additional resistor and the pair of constant voltage diodes provides a stabilized voltage to maintain the charging time of the capacitor constant independently of any fluctuation in the source voltage. In addition, if a voltage remains across the capacitor when the polarity of the source reverses, it is discharged through the diode, constant voltage diodes and resistor, thereby preventing the second disadvantage mentioned above. The improvement is achieved in a practical manner without increasing the complexity of the circuit arrangement or the cost, since only a few elements are added to the conventional circuit.

DETAILED DESCRIPTION OF PREFERRED EMBODIMENTS

Figure 1:
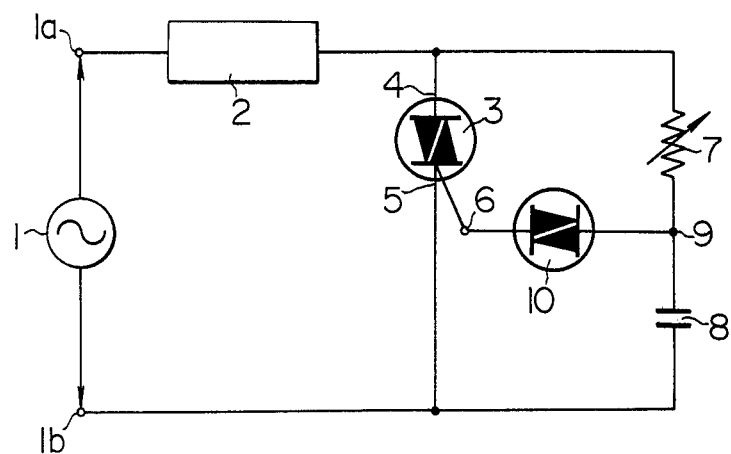
FIG. 1 is a circuit diagram of a conventional a.c. voltage regulator.
Figure 2:
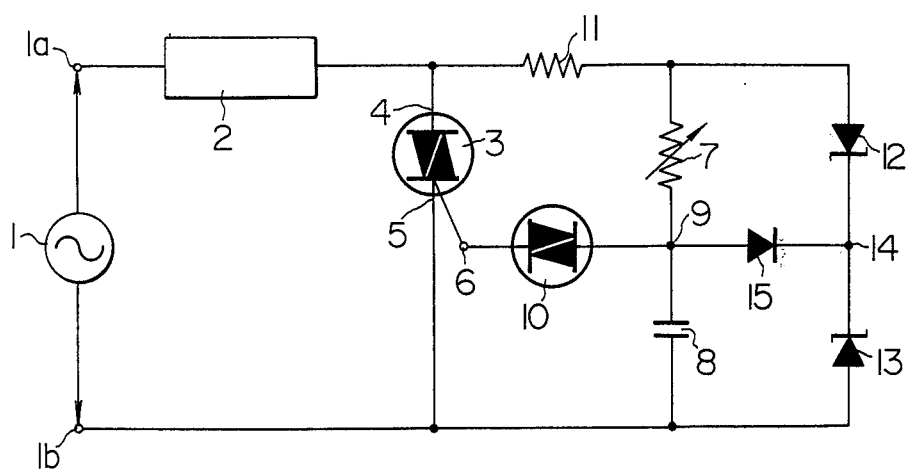
FIG. 2 is a circuit diagram of the a.c. voltage regulator according to one embodiment of the invention.

Referring to FIG. 2, it will be noted that as compared with the conventional regulator shown in FIG. 1, what is added is a resistor, a pair of constant voltage diodes and a diode, which are connected as shown in FIG. 2. Specifically, a resistor 11 is connected between the second anode terminal 4 of the thyristor 3 and one end of the variable resistor 7, and a series circuit comprising a pair of constant voltage diodes 12, 13 is connected across the time constant circuit comprising the resistor 7 and the capacitor 8, with a junction 14 between the diodes 12, 13 being connected with a junction 9 between the resistor 7 and the capacitor 8 through a diode 15.

With this arrangement, the resistor 11 and constant voltage diodes 12, 13 function to provide a bilaterally stabilized voltage which serves to maintain the charging time of the capacitor 8 relatively constant. In one experiment in which a source voltage of 100 volts is used and the effective voltage across the load 2 adjusted to 30 volts, it is found that a source voltage flutuation of ±10% resulted in a variation of the effective voltage which remained in a range of ±13% from 30 volts, thus substantially improving the voltage regulation.

The connection of the diode 15 between the junction 14 between the constant voltage diodes 12, 13 and the junction 9 between the resistor 7 and the capacitor 8 permits any charge on the capacitor 8 to be discharged which may remain when the polarity of the source 1 is reversed. In one experiment in which a source voltage of 100 volts is used and it is attempted to increase the effective voltage across the load gradually beginning from zero volts, it jumped from zero volts to 5 volts. When decreasing the effective voltage, it jumped from 5 volts to zero volts. Thus, a jump in the regulated effective voltage across the load is substantially reduced as compared with the prior art arrangement.

Figure 3:
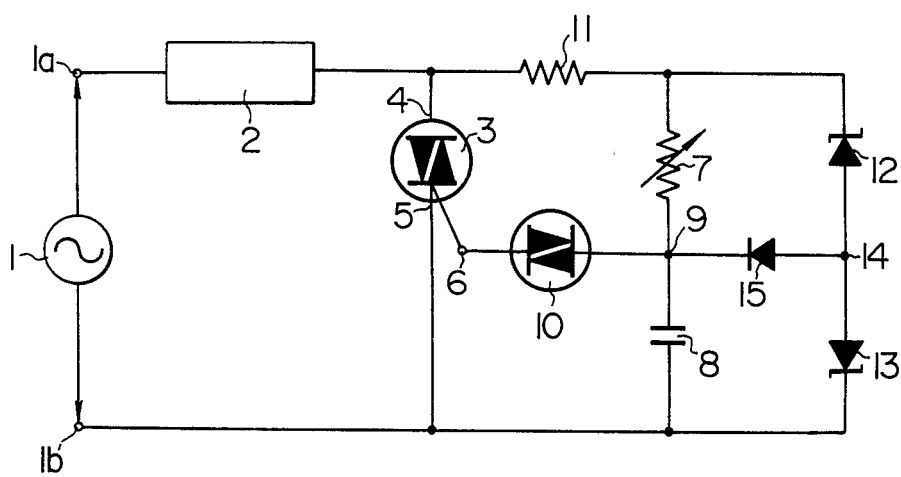
FIG. 3 is a circuit diagram of another embodiment of the invention.

As shown in FIG. 3, the constant voltage diodes 12, 13 and the diode 15 may be oppositely poled from the connection shown in FIG. 2 with a similar result.

What is claimed is:

1. A phase controlled a.c. voltage regulator employing a bilateral thyristor which is connected in series with a load across an a.c. source, and including a time constant circuit formed by a series combination of a variable resistor and a capacitor, the variable resistor having its one end connected with a first anode terminal of the thyristor, and one end of the capacitor being connected with a second anode terminal of the thyristor, with a junction between the resistor and the capacitor being connected with a gate terminal of the thyristor through a bilateral diode, characterized by the provision of a resistor connected between the first anode terminal of the thyristor and the variable resistor, and a pair of constant voltage diodes connected across the series circuit formed by the variable resistor and capacitor and having their junction connected with a junction between the variable resistor and capacitor through a diode.

* * * * *